US012615286B2

(12) United States Patent
Chu et al.

(10) Patent No.: US 12,615,286 B2
(45) Date of Patent: Apr. 28, 2026

(54) KEYSTROKE LOG MONITORING SYSTEMS

(71) Applicant: Capital One Services, LLC, McLean, VA (US)

(72) Inventors: Pei-Wen Chu, Germantown, MD (US); Daniel W. File, Baltimore, MD (US); Hao Liu, Oakton, VA (US); Stephen Shiao, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 315 days.

(21) Appl. No.: 18/136,922

(22) Filed: Apr. 20, 2023

(65) Prior Publication Data

US 2024/0356965 A1 Oct. 24, 2024

(51) Int. Cl.
| | |
|---|---|
| *G06N 3/08* | (2023.01) |
| *G06N 3/04* | (2023.01) |
| *H04L 9/40* | (2022.01) |

(52) U.S. Cl.
CPC ........... *H04L 63/1466* (2013.01); *G06N 3/04* (2013.01); *G06N 3/08* (2013.01); *H04L 63/1416* (2013.01)

(58) Field of Classification Search
CPC ............. H04L 63/1466; H04L 63/1416; H04L 63/1425; H04L 63/1433; H04L 41/22; H04L 67/535; H04L 63/1408; G06N 3/04; G06N 3/08; G06F 3/0237; G06F 3/0488
See application file for complete search history.

(56) References Cited

U.S. PATENT DOCUMENTS

| | | | | |
|---|---|---|---|---|
| 8,131,281 | B1 * | 3/2012 | Hildner ................... | H04L 63/30 |
| | | | | 455/418 |
| 8,732,476 | B1 * | 5/2014 | Van ......................... | H04L 63/08 |
| | | | | 713/182 |
| 10,581,851 | B1 * | 3/2020 | File ......................... | G06N 20/00 |
| 2008/0263636 | A1 * | 10/2008 | Gusler ................ | H04L 63/1466 |
| | | | | 726/4 |

OTHER PUBLICATIONS

Hohnstein, Dwight, "Man in the Terminal," Apr. 5, 2021 (Published in Posts by SpecterOps Team Members); <https://posts.specterops.io/man-in-the-terminal-65476e6165b9>.
M?nica, Diogo, "Poor man's SSH keylogger," Feb. 3, 2011; <https://blog.diogomonica.com/2011/02/03/poor-mans-ssh-keylogger/>.
Deoxykev, "ssh keylogger ? GitHub," Feb. 1, 2020; <https://gist.github.com/deoxykev/f335574effda2d7fd2433baa075f3ea9>.
Bathla, Shivam, "ELK Log Analysis: SSH Logs," Jun. 28, 2020 (Published in Pentester Academy Blog); <https://blog.pentesteracademy.com/elk-log-analysis-ssh-logs-2c7924726973>.

* cited by examiner

*Primary Examiner* — Ryan J Jakovac
(74) *Attorney, Agent, or Firm* — Banner & Witcoff, Ltd.

(57) ABSTRACT

Aspects described herein may allow keystroke logs to be monitored. A computing device may receive a plurality of keystroke logs and provide, to a machine learning model, the plurality of keystroke logs. The computing device may receive, as output from the machine learning model, a value representing a likelihood that a first keystroke log comprises a first command to change a computing system. The computing device may retrieve, from a database, one or more change orders, each indicating an authorization to change the computing system. The computing device may send, to a second computing device and based on determining that the first command does not match the one or more change orders, an alert indicating the first keystroke log. In this way, (Continued)

unauthorized change to the computing system may be detected.

17 Claims, 6 Drawing Sheets

Receive a plurality of keystroke logs — 405

Pre-process the plurality of keystroke logs — 410

Tokenizing each of the plurality of keystroke logs — 415

Scoring each of the plurality of the tokenized keystroke logs — 420

Receive a value that represents a likelihood that a first keystroke log comprises a first command to change a computing system — 425

400

KEYSTROKE LOG MONITORING SYSTEMS

FIELD OF USE

Aspects of the disclosure relate generally to data processing. More specifically, aspects of the disclosure may provide for systems and methods for monitoring keystroke logs.

BACKGROUND

A computing system may suffer great damage if an unauthorized change is made, especially if the computing system operates on critical data such as financial account information. For example, an inadvertent change that deletes a software module may result in the malfunction of the system. In another example, a malicious change made by a hacker may cause sensitive data to be lost or misused. Regardless of the risk, thousands of changes may be made to a complicated computing system every day. For example, a great number of applications in a computing system may need to be updated on a regular basis. An effective way to monitor unauthorized changes to a computing system without interfering with regular software maintenance is needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A complicated computing system may comprise thousands of applications. Many applications operate on critical data. For example, the information technology (IT) system of a financial institution may have a great number of applications that operate on financial account information. On one hand, an unauthorized change made to the computing system may cause great damage to the system. For example, if an engineer inadvertently deletes a component of a software program, the computing system may be malfunctioning. In another example, a hacker may make a malicious change that modifies an application, causing critical data to be lost or misused. On the other hand, thousands of commands may be made to the computing system every day. Some commands may alter the computing system (e.g., updating applications regularly or upon detection of a specific defect). Other commands may not alter the computing system (e.g., reading information from the computing system). An effective way is needed to automatically identify commands that alter the computing system and determine whether the alteration is authorized or not.

To overcome limitations in the prior art described above, and to overcome other limitations that will be apparent upon reading and understanding the present specification, aspects described herein are directed towards monitoring keystroke logs. In at least some embodiments, a computing device may receive a plurality of keystroke logs and provide, to a machine learning model, the plurality of keystroke logs. The machine learning model may be trained, based on a plurality of training keystroke logs comprising labeled change commands, to output, in response to an input keystroke log, a value representing a likelihood that the input keystroke log comprises a command to change a computing system. The computing device may receive, as output from the machine learning model, a value representing a likelihood that a first keystroke log comprises a first command to change a computing system. The computing device may retrieve, from a database, one or more change orders, each indicating an authorization to change the computing system. The computing device may compare the first command with the one or more change orders, determine that the first command does not match the one or more change orders, and send, to a second computing device and based on the determining, an alert indicating the first keystroke log.

The computing device may receive a response, to the alert, that indicates whether the first keystroke log comprises the first command or not. The computing device may adjust, based on the response, the machine learning model.

Each of the plurality of keystroke logs may indicate keystrokes made by one or more users during a secure socket shell (SSH) session.

The value representing the likelihood that the first keystroke log comprises the first command to change the first computing system may be based on a logistic regression model.

The computing device may provide the plurality of keystroke logs by tokenizing each of the plurality of keystroke logs into one or more tokens and scoring, based on a coefficient of each of the corresponding one or more tokens, each of the plurality of tokenized keystroke logs.

The computing device may receive the plurality of keystroke logs by receiving, from a second database, binary large object (BLOB) data recorded during one or more secure socket shell (SSH) sessions and extracting, from the BLOB data, the plurality of keystroke logs.

The computing device may further replace, before the providing and based on a mapping between a plurality of keywords and a plurality of file extensions, a portion of the plurality of keystroke logs with one or more of the plurality of keywords.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

To facilitate detecting unauthorized changes made to a computing system, aspects discussed herein may provide a computer-implemented method directed toward monitoring keystroke logs. A machine learning model may be configured to analyze keystroke logs recorded by a computing system. Each of the keystroke logs may record a sequence of keystrokes the computing system receives. If the machine learning model determines that a keystroke log comprises one or more commands to change the computing system (e.g., update software, add data into the system, or delete data from the system), the machine learning model may output the result to a computing device that is communicatively connected with the machine learning model. The computing device may retrieve one or more change orders that describes authorized changes to the computing system during a time range. If the commands to change the computing system do not match any of the one or more change orders, the computing device may send one or more alerts to a user (e.g., an engineer) to further determine whether an unauthorized change has been made. The machine learning model may be trained by labeled keystroke logs. The machine learning may also be optimized based on the user's feedback indicating whether an output result is accurate or not.

Aspects discussed herein improves the functioning of computers because the risk of a computing system is reduced by the keystroke logs monitoring.

Before discussing these concepts in greater detail, however, several examples of a computing device that may be used in implementing and/or otherwise providing various aspects of the disclosure will first be discussed with respect to FIG. 1.

Figure 1:
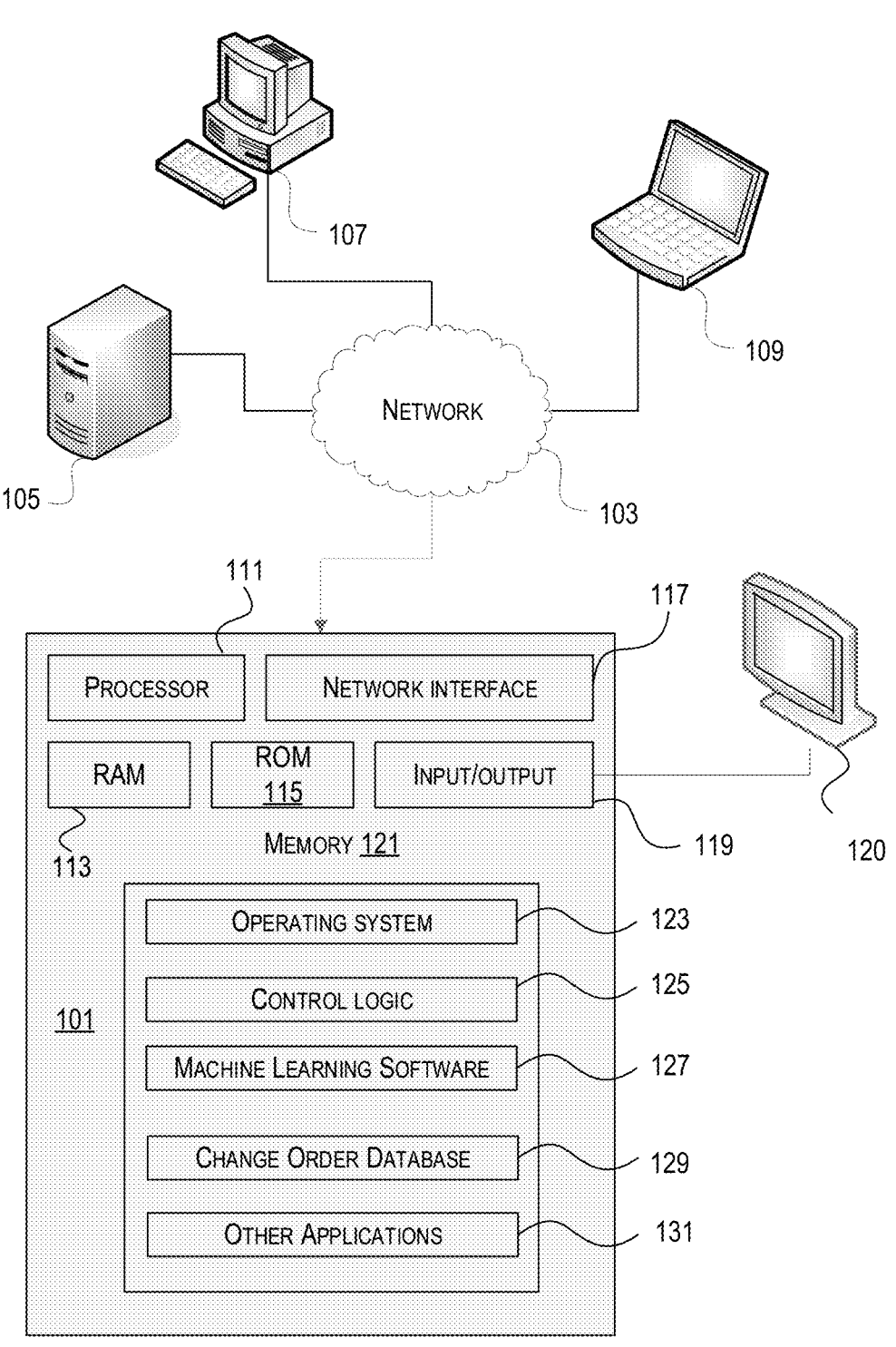
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading or executing instructions and performing one or more actions based on the instructions. In some embodiments, computing device 101 may represent, be incorporated in, or include various devices such as a desktop computer, a computer server, a mobile device (e.g., a laptop computer, a tablet computer, a smartphone, any other type of mobile computing devices, and the like), or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., key board, mouse, display, printer, etc.), and memory 121. Processor 111 may include one or more computer processing units (CPUs), graphical processing units (GPUs), or other processing units such as a processor adapted to perform computations associating converting information, routing copies of messages, or other functions described herein. I/O 119 may include a variety of interface units and drives for reading, writing, displaying, or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, machine learning software 127, change order database 129, and other applications 131 may be stored in a memory of a computing device used at a server system that will be described further below. Control logic 125 may be incorporated in or may comprise a linking engine that updates, receives, or associates various information stored in the memory 121. In other embodiments, computing device 101 may include two or more of any or all of these components (e.g., two or more processors, two or more memories, etc.) or other components or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125.

One or more aspects discussed herein may be embodied in computer-usable or readable data or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

The data transferred to and from various computing devices may include secure and sensitive data, such as confidential documents, customer personally identifiable information, and account data. Therefore, it may be desirable to protect transmissions of such data using secure network protocols and encryption, or to protect the integrity of the data when stored on the various computing devices. A file-based integration scheme or a service-based integration scheme may be utilized for transmitting data between the various computing devices. Data may be transmitted using various network communication protocols. Secure data transmission protocols or encryption may be used in file transfers to protect the integrity of the data such as, but not limited to, File Transfer Protocol (FTP), Secure File Transfer Protocol (SFTP), or Pretty Good Privacy (PGP) encryption. In many embodiments, one or more web services may be implemented within the various computing devices. Web services may be accessed by authorized external devices and customers to support input, extraction, and manipulation of data between the various computing devices. Web services built to support a personalized display system may be cross-domain or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, or firewalls. Such specialized hardware may be installed and configured in front of one or more computing devices such that any external devices may communicate directly with the specialized hardware.

Figure 2A:
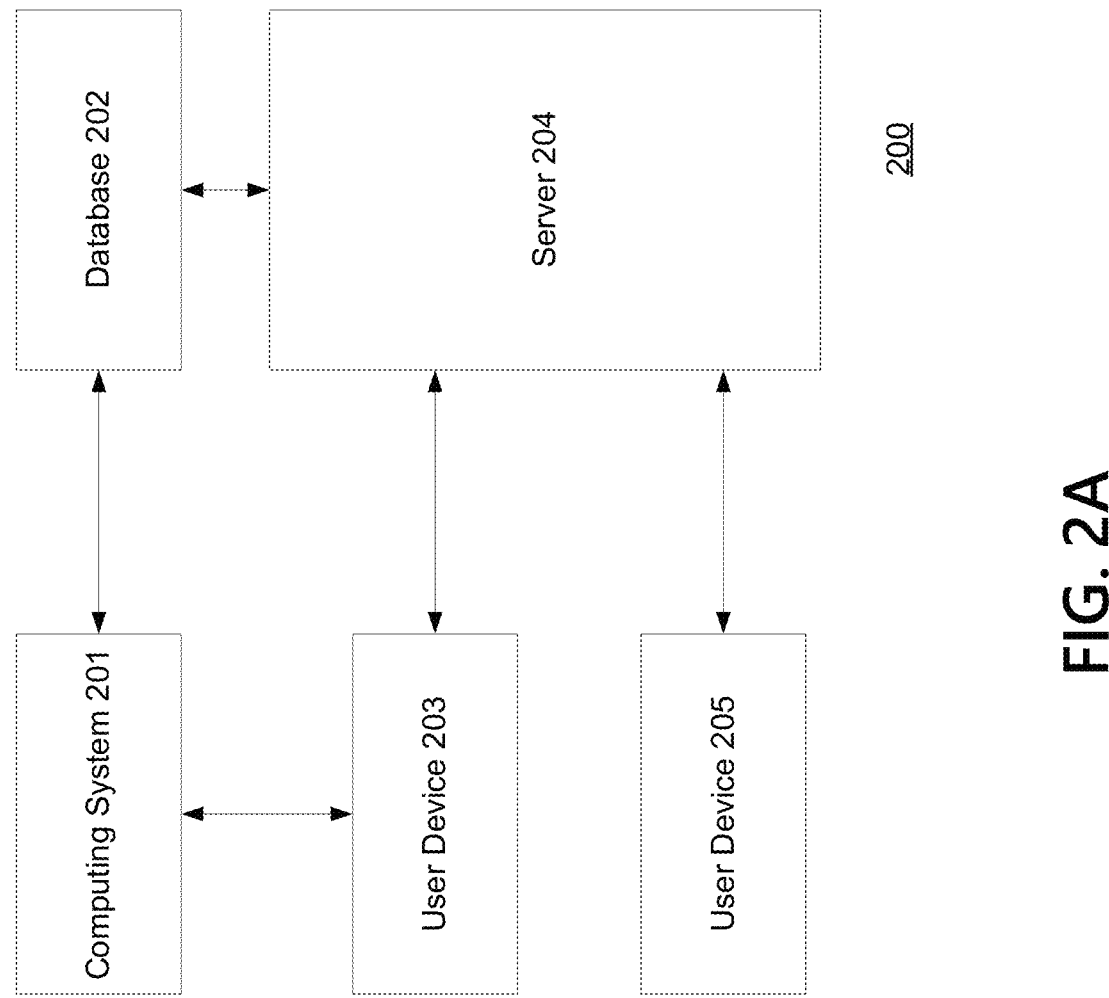
FIG. 2A depicts an example computing environment in accordance with one or more illustrative aspects discussed herein.

FIG. 2A depicts an illustrative computing environment for monitoring keystroke logs in accordance with one or more example embodiments. Referring to FIG. 2A, computing environment 200 may include a computer system 201, a database 202, a user device 203, a server 204, and a user device 205. Each of the computer system 201, database 202, user device 203, server 204, and user device 205 may be a computing device 101 as described in FIG. 1. Each of the computer system 201, database 202, user device 203, server 204, and user device 205 may communicate with other devices via network 103 as described in FIG. 1.

The computing system 201 may comprise a plurality of computing devices. The computing system 201 may belong to an entity (e.g., a company or an organization). The computing system 201 may comprise the information technology (IT) system of the entity. For example, the computing system 201 may comprise databases that store data for the entity, and/or comprise applications that the users associated with the entity may operate on the data. For example, the computing system 201 may belong to a financial service institution. The computing system 201 may comprise a plurality of databases that stores customer data (e.g., financial account information) for the financial service institution. A plurality of applications hosted by the computing system 201 may allow employees of the financial service institution and/or customers of the financial service institution to operate on those data (e.g., making commercial transactions, depositing money to an account, transferring money to an account, etc.). It is crucial for the computing system 201 to operate correctly.

The software of the computing system 201 may need to be maintained from time to time. For example, multiple engineers may, via their user devices (e.g., user device 203), access the computing system. The engineers may read data from the computing system 201 (e.g., to test whether the computing system 201 is operating smoothly) and/or update the software of the computing system 201 as needed. For example, the user device 203, associated with an engineer, may establish a secure socket shell (SSH) session with the computing system 201. The user device 203 may receive input commands by the engineer and send the input commands to the computing system 201.

Some commands may not alter the computing system 201. For example, commands that request data to be sent from the computing system 201 to the user device 203 may not alter the computing system 201. For example, the user device 203 may obtain data indicating the current status of the computing system 201, to allow the engineer associated with the user device 203 to evaluate whether the computing system 201 is operating as expected. Some commands may alter (make changes) to the computing system 201. For example, the user device 203 may send a command to revise the software of an application hosted by the computing system 201.

A command may make an unauthorized change to the computing system 201. For example, an engineer may make an unauthorized change by mistakes. In another example, a hacker may make an unauthorized change to attack the computing system 201. An unauthorized change to the computing system 201 may be harmful to the computing system 201, especially if the computing system 201 operates on sensitive data such as the financial account information of customers. On the other hand, thousands of commands may be made to the computing system every day. An effective way is needed to automatically identify commands that alter the computing system and determine whether the alteration is authorized or not.

As described herein, the computing system 201 may log (e.g., record) at least some of the commands the computing system 201 receives. The commands may be logged as keystroke logs. A keystroke log may comprise a sequence of keystrokes input into the computing system 201. A keystroke log may also comprise other information associated with the sequence of keystrokes. For example, the keystroke log may comprise a timestamp indicating a time when the keystrokes are received by the computing system 201. In another example, the keystroke log may comprise information associated with the user device 203 that sends the keystrokes to the computing system 201 (e.g., device ID of the user device 203, user ID of the user associated with the user device 203, access level of the user associated with the user device 203, the IP address of the user device 203). The computing system 201 may communicate with database 202. The database 202 may store the keystroke logs. A server 204 may obtain the keystroke logs of the computing system 201 (e.g., from the database 202) to determine whether commands that make changes to the computing system 201 are authorized or not. FIG. 2A describes the database 202 as a device separate from the server 204 and/or the computing system 201. However, it is appreciated that the database 202 may be a storage component located in the computing system 201 or the server 204.

Additionally or alternatively, as described herein, the database 202 may store a plurality of change orders. Each of the plurality of change orders may describe an authorized change to the computing system 201. For example, a change order may describe one or more of: a time range during which a change to a computing system 201 is scheduled to be made, the type of change to be made, the application (or component) in the computing system 201 that is to be changed, or the device identification (ID) or user ID associated with the change. The information in the change order is merely examples. It is appreciated that other information may be possible. The server 204 may determine whether a command to change the computing system 201 matches one or more of the change orders. If the server 204 determines that a command to change the computing system 201 does not match any of the one or more of the change orders, the server 204 may send an alert to the user device 205. The alert may identify the keystroke log that is suspected to comprise an unauthorized command to change the computing system 201. The user device 205 may be associated with a user in the entity. The user associated with the user device 205 may determine whether the identified keystroke log comprises an unauthorized command to change the computing system 201. The user may provide feedback to the server 204 regarding whether the alert is accurate or not. The server 204 may make adjustments (e.g., on a machine learning model that the server 204 uses) to improve the accuracy of its determination in the future.

Figure 2B:
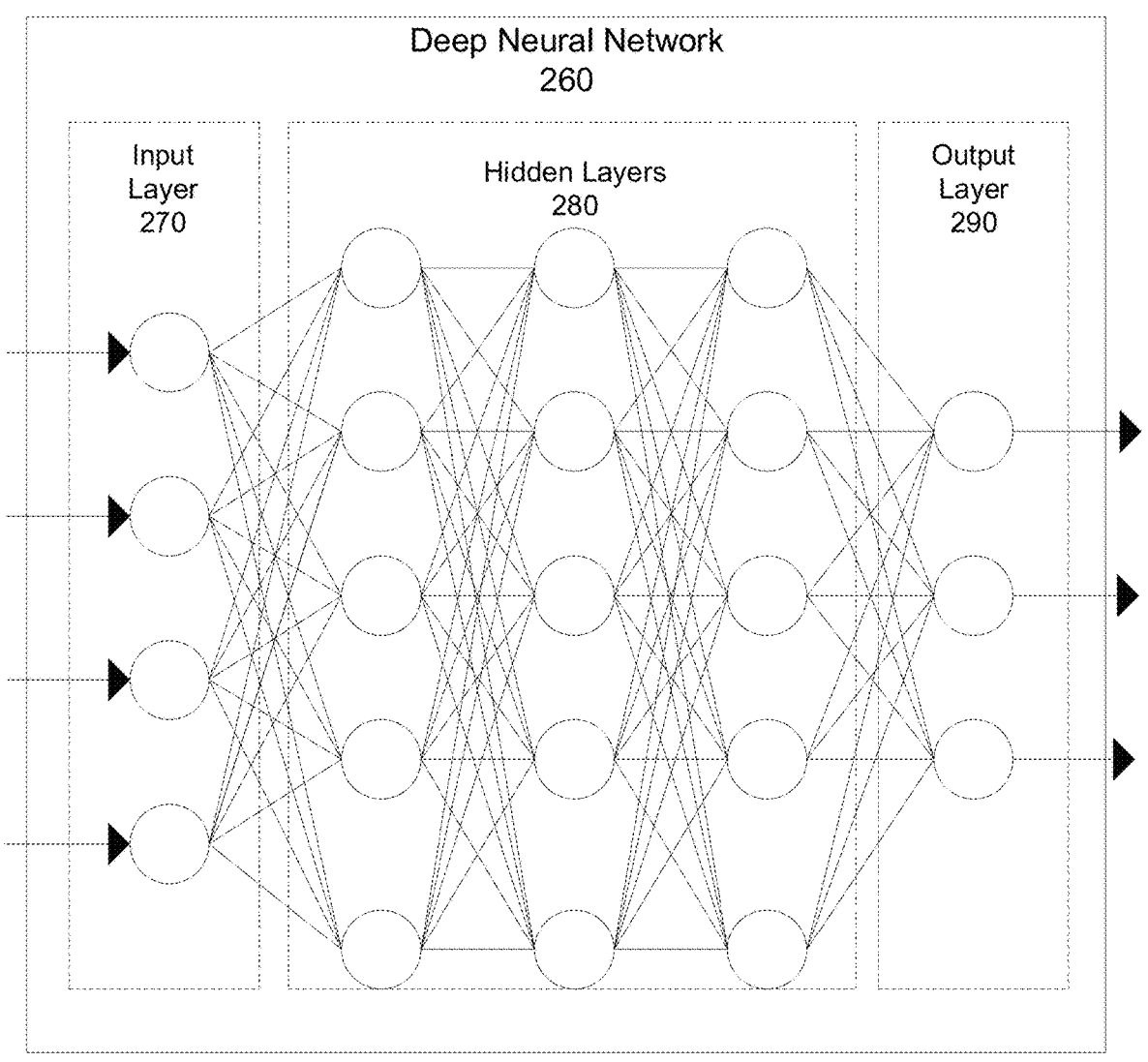
FIG. 2B depicts an example deep neural network architecture for a machine learning model according to one or more aspects of the disclosure.

FIG. 2B illustrates an example deep neural network 260. Such a deep neural network architecture may be all or portions of the machine learning software 127 shown in FIG. 1. The deep neural network 260 may be all or portions of the machine learning model described in connection with FIG. 2A, FIG. 3 and FIG. 4. The architecture depicted in FIG. 2B need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 270, one or more hidden layers 280, and an output layer 290. A deep neural network, as used herein, may be an artificial network that has more than one hidden layer. Illustrated network architecture 260 is depicted with three hidden layers, and thus may be considered a deep neural network. The number of hidden layers employed in deep neural network 260 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
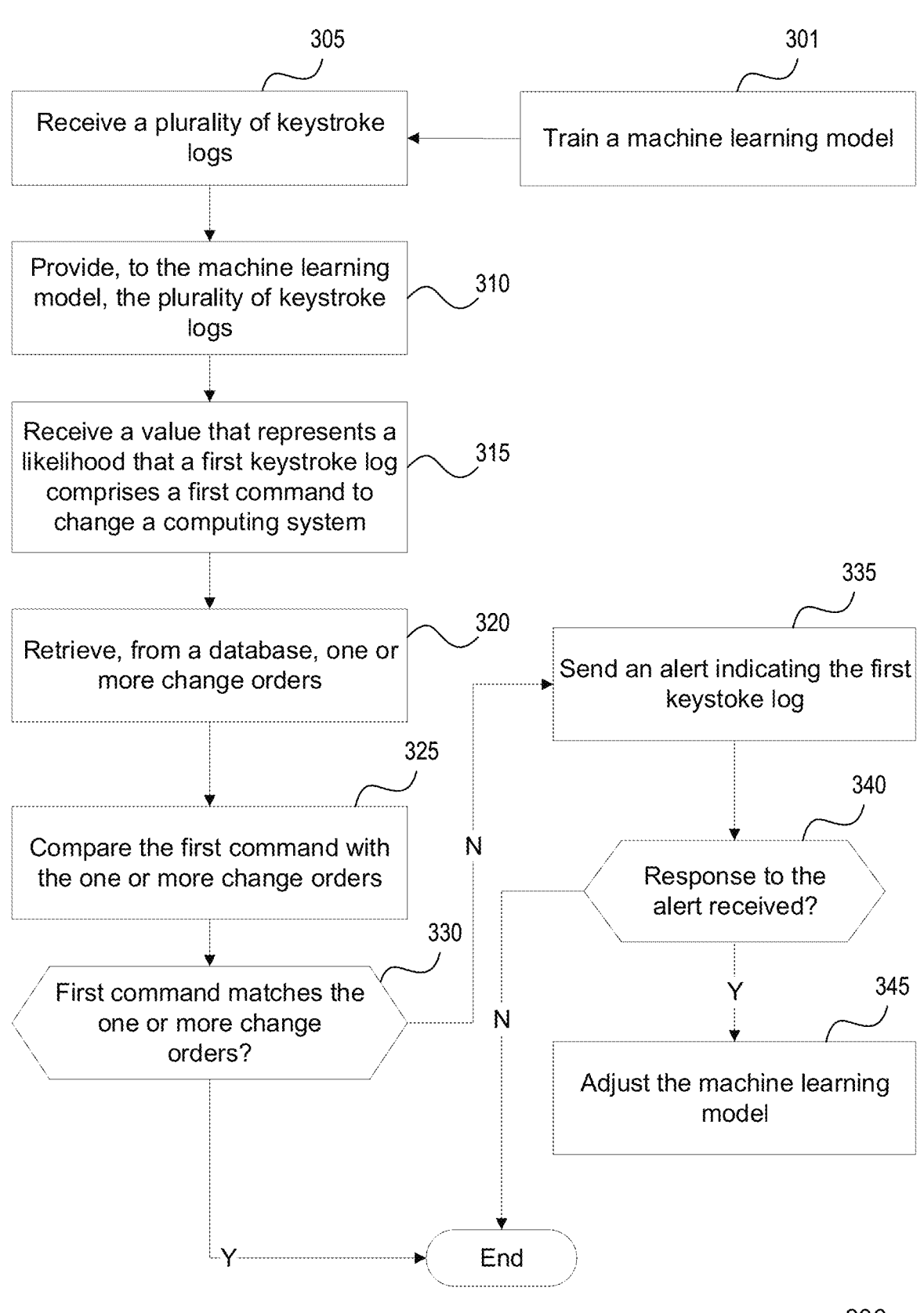
FIG. 3 is a flow diagram of an example method for monitoring keystroke logs in accordance with one or more illustrative aspects discussed herein.

FIG. 3 is a flow diagram depicting a method 300 for monitoring keystroke logs in accordance with one or more illustrative aspects discussed herein. The steps in method 300 may be performed by a system comprising, for example, server 204 and user device 205 as may be shown in FIG. 2A.

At step 301, a machine learning model may be trained, based on a plurality of training keystroke logs comprising one or more commands (labeled or unlabeled), to output, in response to an input keystroke log, a value representing a likelihood that the input keystroke log comprises a command to change a computing system. The machine learning model may comprise a deep neural network 260 as shown in FIG. 2B. The machine learning model may be based on one or more mathematical models (e.g., a logistic regression model). The machine learning model may be operated on the server 204, or may be operated on one or more other computing devices (e.g., computing device 101) that communicate with the server 204 over a network (e.g., network 103).

As discussed in connection with FIG. 2A, a keystroke log may comprise a record of one or more keystrokes that a computing system 201 receives. The plurality of training keystroke logs may comprise a plurality of first training keystroke logs. The plurality of first training keystroke logs may each comprise one or more labeled commands and/or words. The label may indicate whether the corresponding command and/or word alter a computing system or not. For example, Linux commands "submit," "aws," or "python3" may be labeled as commands that have a high likelihood of making changes to a computing system. In another example, Linux commands such as "tail" or "cat" may be labeled as having a low likelihood of making changes to a computing system, since the commands merely request the display of certain content. The plurality of training keystroke logs may comprise a plurality of second training keystroke logs and/or a plurality of third training keystroke logs, as described below in greater detail.

The value may comprise a numerical number (e.g., 4, 10). For example, a larger number may indicate a higher likelihood that the input keystroke log comprises a command to change a computing system. A keystroke log may be determined as comprising a command to change a computing system if the value exceeds a threshold (e.g., 5). The value of numerical numbers and threshold are merely examples, and other values are possible. The value may also comprise other information, such as the type of change the command is to make.

At step 305, a first computing device (e.g., server 204) may receive a plurality of keystroke logs. A keystroke log may comprise a record of one or more keystrokes that a computing system 201 receives. For example, as described in connection with FIG. 2A, a user device (e.g., the user device 203) may establish a connection with the computing system 201 and send commands to the computing system 201. For example, each of the plurality of keystroke logs may indicate keystrokes made by one or more users during a session (e.g., a secure socket shell (SSH) session). The computing system 201 may log the commands the computing system receives as keystroke logs. The plurality of keystroke logs may be stored (e.g., by the computing system 201) in a database 202 as described in FIG. 2A. The plurality of keystroke logs may be recorded as binary large object (BLOB) data during one or more sessions between the user device 203 and the computing system 201. The first computing device may extract, from the BLOB data, the plurality of keystroke logs.

Figures 5A, 5B, 5C:
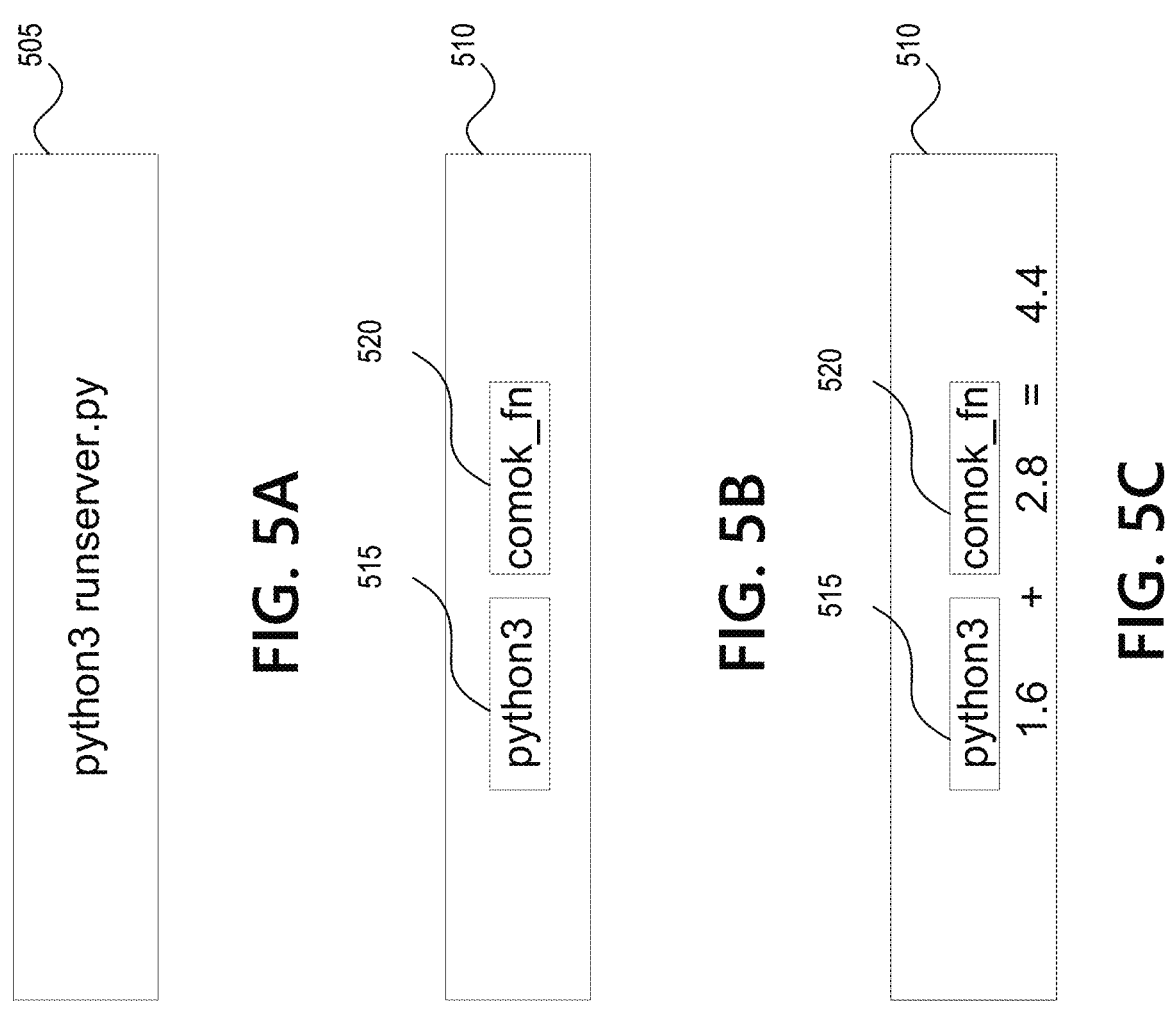
FIG. 5A shows illustrative keystroke logs in accordance with one or more illustrative aspects discussed herein.
FIG. 5B shows illustrative keystroke logs in accordance with one or more illustrative aspects discussed herein.
FIG. 5C shows illustrative keystroke logs in accordance with one or more illustrative aspects discussed herein.

Each of the keystroke logs may comprise a sequence of keystrokes. The sequence of keystrokes may be associated with one or more commands made to the computing system 201. For example, as shown in FIG. 5A, keystrokes in a first keystroke log 505 may comprise a command "python3 runserver.py." A keystroke log may also comprise information associated with the keystrokes. For example, a keystroke log may comprise a timestamp indicating a time when the keystrokes are received by the computing system 201. In another example, the keystroke log may comprise information associated with the user device 203 that sends the keystrokes to the computing system 201 (e.g., the device ID of the user device 203, user ID of the user associated with the user device 203, the access level of the user associated with the user device 203, the IP address of the user device 203).

At step 310, the first computing device may provide, to the machine learning model, the plurality of keystroke logs. As described in greater detail in FIG. 4, the first computing device may (e.g., via the machine learning model) tokenize an input keystroke log and score a keystroke log based on the coefficient of each token in the tokenized keystroke log. The keystroke log may be pre-processed before being scored.

At step 315, the first computing device may receive, as output from the machine learning model, a value representing a likelihood that a first keystroke log comprises a first command to change a computing system. For example, for each of the plurality of keystroke logs received by the first computing device, the machine learning model may output a corresponding value. The first computing device may identify the keystroke logs of which the output value exceeds a threshold. The identified keystroke logs may comprise a first keystroke log. For convenience, the discussion below describes the first computing device's operation on the first keystroke log. It is appreciated that the first computing device may make similar operations on each of the identified keystroke logs.

At step 320, the first computing device may retrieve, from a database (e.g., database 202), one or more change orders, each indicating an authorization to change the computing system 201. A change order may comprise a description of an authorized change to the computing system 201. For example, a change order may describe one or more of: a time range during which a change to a computing system 201 is scheduled to be made, the type of change, the scope of the change, the application/component in the computing system 201 that is to be changed, or the device identification (ID) or user ID associated with the change. For example, an application hosted by the computing system 201 may be scheduled to be updated on Mar. 17, 2023. The change order may comprise the application ID, the time range (e.g., Mar. 17, 2023), the type/scope of the change (e.g., a certain portion of the application is to be updated, or a certain defect in the application is to be fixed), the user who is authorized to make the change (e.g., identified by device ID, user ID, device address, user's access level, etc.).

At step 325, the first computing device may compare the first keystroke log with the one or more change orders. For example, the first computing device may determine the time when the keystroke log is recorded, and compare the time with time ranges indicated in the one or more change orders. In another example, the first computing device may compare the device ID associated with the user device that inputs the keystrokes with the authorized device in the one or more change orders.

At step 330, the first computing device may determine whether the first keystroke log matches the one or more change orders or not. The first computing device may determine the first command matches the one or more change orders if the first computing device finds a change order, of the one or more change orders, that describes an authorized change matching the change that the commands in the first keystroke log make. For example, an authorized change matches the change that the commands make if the time range to make the change, indicated in a change order, matches the time range when the commands in the first keystroke log take effect. In another example, an authorized change matches the change that the commands make if the user ID associated with the user who is authorized to make the change, indicated in the change order, matches the user ID associated with the user who inputs the keystrokes. If the first computing device determines that the first command does not match the one or more change orders, the method may proceed to step 335.

At step 335, the first computing device may send, to a second computing device (e.g., the user device 205) and based on the determination, an alert indicating the first keystroke log. The alert may indicate the first keystroke log has a high likelihood of comprising a command to change the computing system 201 and/or the first keystroke log does not match any of the one or more change orders. The alert may also comprise other information to facilitate the user associated with the second computing device to determine whether an unauthorized change is made to the computing system 201. For example, the alert may identify the commands, in the first keystroke log, that have a high likelihood to change the computing system 201. The alert may indicate the time range, device ID, and/or other relevant information associated with the first keystroke log. A user associated with the second computing device may determine whether the commands in the first keystroke log make a change to the computing system 201 or not, and may take action accordingly. For example, if an unauthorized change is detected, the user may restore the computing system 201.

At step 340, the first computing device may determine whether a response, to the alert, is received. The response may indicate whether the first keystroke log comprises the first command or not. For example, the user associated with the second computing device may analyze commands in the first keystroke log, and then determine whether the output result of the machine-learning model is correct or not. The user may provide feedback via a response to the alert. The response may indicate whether the output result of the machine learning model regarding the first keystroke log is correct or not. For example, the response may indicate that, contrary to the machine learning model's output result, the commands in the first keystroke log do not change the computing system 201. In an example where the type of change is determined by the machine learning model, the response may indicate, for example, the type of change determined by the machine learning model is correct or not. If the first computing device determines that a response is received, the method may proceed to step 345.

At step 345, the first computing device may adjust, based on the response, the machine learning model. The first computing device may generate a second training keystroke log comprising the first keystroke log and information obtained from the response. For example, if the response indicates the first keystroke log comprises commands to change the computing system 201, the machine learning model may adjust parameters based on this positive feedback (reward). If the response indicates the first keystroke log does not comprise commands to change the computing system 201, the machine learning model may adjust model parameters based on this negative feedback (penalty). The parameters may be described in greater detail in connection with FIG. 2B.

Additionally or alternatively, the second computing device may identify keystroke logs that comprise commands to change the computing system 201 but the machine learning model initially fails to detect. For example, if the user associated with the second computing device determines an unauthorized change that the first computing device fails to alert the second computing device, the second computing device may identify the keystroke log corresponding to the unauthorized change and send the identified keystroke log to the first computing device. The first computing device may generate a third training keystroke log based on the identified keystroke log and the unauthorized change. The machine learning model may adjust model parameters based on the third training keystroke log. The parameters may be described in greater detail in connection with FIG. 2B.

The steps of method 300 may be modified, omitted, or performed in other orders, or other steps added as appropriate.

Figure 4:
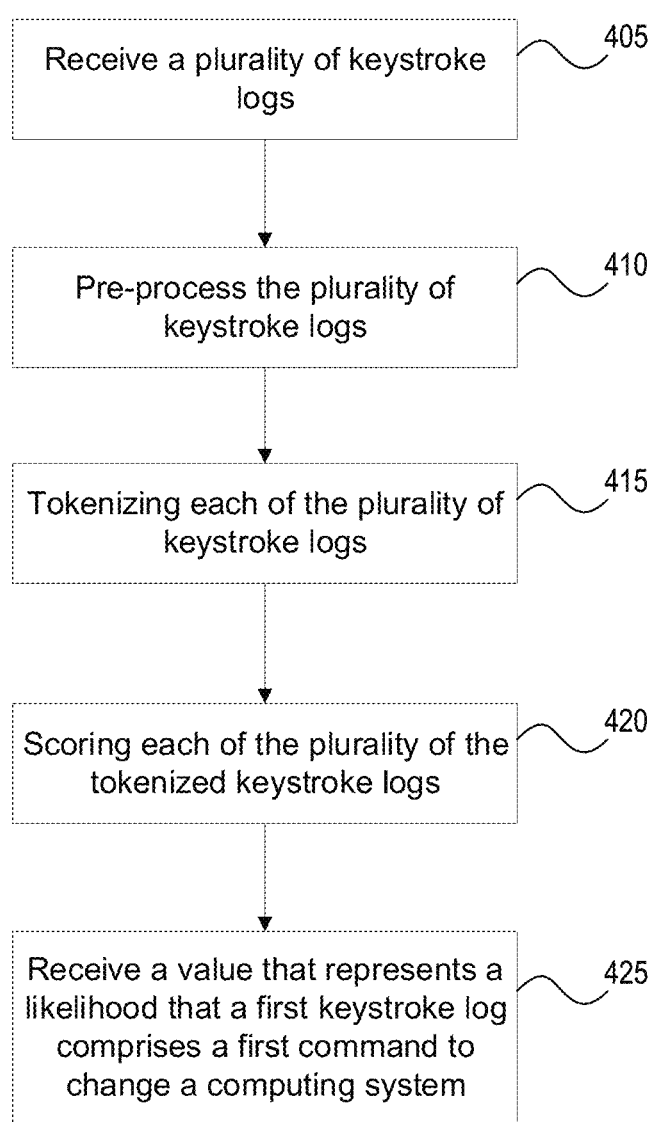
FIG. 4 is a flow diagram of an example method for analyzing keystroke logs in accordance with one or more illustrative aspects discussed herein.

FIG. 4 is a flow diagram depicting a method 400 for analyzing keystroke logs in accordance with one or more illustrative aspects discussed herein. The steps in method 400 may be performed by a system comprising, for example, server 204 and user device 205 as may be shown in FIG. 2A.

At step 405, a first computing device (e.g., server 204) may receive a plurality of keystroke logs. For example, the plurality of keystroke logs may be received similarly to as described in step 305. The first computing device may process the plurality of keystroke logs at steps 410 to 420 as described herein. One or more of steps 410 to 420 may be performed by a machine learning model as described in connection with FIG. 3.

At step 410, the first computing device may pre-process the plurality of keystroke logs. For example, the first computing device may replace, based on a mapping between a plurality of keywords and a plurality of file extensions, a portion of the plurality of keystroke logs with one or more of the plurality of keywords. FIG. 5A shows an example keystroke log 505. The keystroke log 505 may comprise a sequence of keystrokes "python3 runserver.py." The first computing device may determine that "runserver.py" is the name of a Python script. The first computing device may replace the "runserver.py" with the keyword "comok_fn," for example, based on a mapping between the keyword "comok_fn" and the file extension ".py". As shown in FIG. 5B, the pre-processed keystroke log 510 may comprise a sequence of keystrokes "python 3 comok_fn."

At step 415, the first computing device may tokenize each of the plurality of keystroke logs into one or more tokens. A token may comprise a sequence of keystrokes that represents a meaningful expression (e.g., a word, a command, a file name, etc.). A keystroke log may be broken into one or more tokens. Consistent with the example in FIG. 5B, the keystroke log 510 may be broken into two tokens. The two tokens may comprise a first token 515 "python3" and a second token 520 "comok_fn."

At step 420, the first computing device may score, based on a coefficient of each of the corresponding tokens, each of the plurality of tokenized keystroke logs. The coefficient of each token may be determined by the machine learning model (e.g., the machine learning model described in FIG. 3). As the machine learning model receives more training keystroke logs, new tokens may be added, and/or the coefficient of each token may be adjusted (e.g., based on labels on the training keystroke logs, or responses as described in connection with step 345 in FIG. 3). As shown in FIG. 5C, the coefficient of the first token 515 "python3" may be 1.6. The coefficient of the second token 520 "comok_fn" may be 2.8. The first computing device may score the keystroke log 510 by adding the coefficient of the first token 515 and the coefficient of the second token 520. As shown in FIG. 5C, the score of the keystroke log 510 may be 4.4.

Referring to FIG. 4, at step 425, the first computing device may receive a value representing a likelihood that a first keystroke log comprises a first command to change a computing system. Consistent with the example in FIGS. 5A to 5C, the value of the first keystroke log may be 4.4. The first computing device may compare the value with a threshold. For example, the threshold may be 3. The first computing device may determine, based on the value exceeding the threshold, that the value indicates the high likelihood that the first keystroke log comprises a first command to change a computing system. The first computing device may further analyze whether the change caused by the first command is authorized. For example, the first computing device may determine whether the change caused by the first command is authorized by determining whether the first command matches one or more change orders, as described in connection with FIG. 3. The first computing device may further take action based on the determination on whether the first command is authorized, for example, as described in connection with FIG. 3.

The steps of method 400 may be modified, omitted, or performed in other orders, or other steps added as appropriate.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. Accordingly, the scope of the invention should be determined not by the embodiments illustrated, but by the appended claims and their equivalents.

What is claimed is:

1. A method comprising:
   receiving, by a first computing device, a plurality of keystroke logs;

generating a plurality of tokenized keystroke logs by tokenizing each of the plurality of keystroke logs into one or more respective tokens;

providing, to a machine learning model, the plurality of tokenized keystroke logs, wherein the machine learning model is trained, based on a plurality of training keystroke logs comprising labeled change commands, to output, in response to an input keystroke log, a value representing a likelihood that the input keystroke log comprises a command to change a computing system, wherein the likelihood is lower than one hundred percent;

receiving, as output from the machine learning model, a value representing a likelihood that a first keystroke log comprises a first command to change a computing system by:

tokenizing the first keystroke log into one or more first tokens; and calculating the value based the one or more first tokens;

retrieving, from a database, one or more change orders, each indicating an authorization to change the computing system;

comparing the first keystroke log with the one or more change orders;

determining that the first command does not match the one or more change orders; and sending, to a second computing device and based on the determining, an alert indicating the first keystroke log.

2. The method of claim 1, further comprising:

receiving a response to the alert, wherein the response indicates whether the first keystroke log comprises the first command or not; and adjusting, based on the response, the machine learning model.

3. The method of claim 1, wherein each of the plurality of keystroke logs indicates keystrokes made by one or more users during a secure socket shell (SSH) session.

4. The method of claim 1, wherein the value representing the likelihood that the first keystroke log comprises the first command to change the first computing system is based on a logistic regression model.

5. The method of claim 1, wherein the receiving the plurality of keystroke logs comprises:

receiving, from a second database, binary large object (BLOB) data recorded during one or more secure socket shell (SSH) sessions; and extracting, from the BLOB data, the plurality of keystroke logs.

6. The method of claim 1, further comprising:

replacing, before the providing and based on a mapping between a plurality of keywords and a plurality of file extensions, a portion of the plurality of keystroke logs with one or more of the plurality of keywords.

7. A system comprising:

a first computing device; and a second computing device;

wherein the first computing device is configured to:

receive a plurality of keystroke logs;

generate a plurality of tokenized keystroke logs by tokenizing each of the plurality of keystroke logs into one or more respective tokens;

provide, to a machine learning model, the plurality of tokenized keystroke logs, wherein the machine learning model is trained, based on a plurality of training keystroke logs comprising labeled change commands, to output, in response to an input keystroke log, a value representing a likelihood that the input keystroke log comprises a command to change a computing system, wherein the likelihood is lower than one hundred percent;

receive, as output from the machine learning model, a value representing a likelihood that a first keystroke log comprises a first command to change a first computing system by:

tokenizing the first keystroke log into one or more first tokens; and calculating the value based on the one or more tokens;

retrieve, from a database, one or more change orders each indicating an authorization to change the first computing system;

compare the first keystroke log with the one or more change orders;

determine the first command does not match the one or more change orders; and send, to a second computing device and based on the determining, an alert indicating the first keystroke log; and wherein the second computing device is configured to:

receive, from the first computing device, the alert.

8. The system of claim 7, wherein the first computing device is further configured to: receive a response to the alert, wherein the response indicates whether the first keystroke log comprises the first command or not; and adjust, based on the response, the machine learning model.

9. The system of claim 7, wherein each of the plurality of keystroke logs indicates keystrokes made by one or more users during a secure socket shell (SSH) session.

10. The system of claim 7, wherein the value representing the likelihood that the first keystroke log comprises the first command to change the first computing system is based on a logistic regression model.

11. The system of claim 7, wherein the first computing device is configured to receive the plurality of keystroke logs by performing actions comprising:

receiving, from a second database, binary large object (BLOB) data recorded during one or more secure socket shell (SSH) sessions; and extracting, from the BLOB data, the plurality of keystroke logs.

12. The system of claim 7, wherein the first computing device is further configured to:

replace, before the providing and based on a mapping between a plurality of keywords and a plurality of file extensions, a portion of the plurality of keystroke logs with one or more of the plurality of keywords.

13. A non-transitory computer-readable medium storing computer instructions that, when executed by one or more processors, cause performance of actions comprising:

receiving a plurality of keystroke logs;

generate a plurality of tokenized keystroke logs by tokenizing each of the plurality of keystroke logs into one or more respective tokens;

providing, to a machine learning model, the plurality of tokenized keystroke logs, wherein the machine learning model is trained, based on a plurality of training keystroke logs comprising labeled change commands, to output, in response to an input keystroke log, a value representing a likelihood that the input keystroke log comprises a command to change a computing system, wherein the likelihood is lower than one hundred percent;

receiving, as output from the machine learning model, a value representing a likelihood that a first keystroke log comprises a first command to change a first computing system by:

tokenizing the first keystroke log into one or more first tokens; and calculating the value based on the one or more tokens;

retrieving, from a database, one or more change orders each indicating an authorization to change the first computing system;

comparing the first keystroke log with the one or more change orders;

determining the first keystroke log does not match the one or more change orders;

sending, to a second computing device and based on the determining, an alert indicating the first keystroke log;

receiving a response, to the alert, that indicates whether the first keystroke log comprises the first command or not; and adjusting, based on the response, the machine learning model.

14. The non-transitory computer-readable medium of claim 13, wherein each of the plurality of keystroke logs indicates keystrokes made by one or more users during a secure socket shell (SSH) session.

15. The non-transitory computer-readable medium of claim 13, wherein the value representing the likelihood that the first keystroke log comprises the first command to change the first computing system is based on a logistic regression model.

16. The non-transitory computer-readable medium of claim 13, wherein the instructions, when executed by the one or more processors, cause receiving the plurality of keystroke logs by performing actions comprising:

receiving, from a second database, binary large object (BLOB) data recorded during one or more secure socket shell (SSH) sessions; and extracting, from the BLOB data, the plurality of keystroke logs.

17. The non-transitory computer-readable medium of claim 13, wherein the instructions, when executed by the one or more processors, further cause performance of actions comprising:

replacing, before the providing and based on a mapping between a plurality of keywords and a plurality of file extensions, a portion of the plurality of keystroke logs with one or more of the plurality of keywords.

* * * * *